United States Patent [19]

Bull

[11] 4,013,850
[45] Mar. 22, 1977

[54] TURN SIGNAL ASSEMBLY AND SELF-CANCELLING MEANS ATTACHABLE EXTERNALLY TO A STEERING COLUMN POST

[75] Inventor: Dale L. Bull, Reed City, Mich.

[73] Assignee: Nartron Corporation, Reed City, Mich.

[22] Filed: Apr. 7, 1975

[21] Appl. No.: 565,480

[52] U.S. Cl. .......................... 200/61.27; 200/61.34; 200/61.35; 200/61.54

[51] Int. Cl.² ..................... H01H 3/16; H01H 9/00; B60Q 1/00

[58] Field of Search ................... 200/61.27–61.38, 200/61.54

[56] References Cited

UNITED STATES PATENTS

| | | | |
|---|---|---|---|
| 2,788,405 | 4/1957 | Benquet | 200/61.27 |
| 2,902,556 | 9/1959 | Dryer | 200/61.34 |
| 2,999,911 | 9/1961 | Dryer et al. | 200/61.34 |
| 3,530,266 | 9/1970 | Vitaloni | 200/61.27 X |
| 3,609,264 | 9/1971 | Suzuki et al. | 200/61.34 |
| 3,796,846 | 3/1974 | Wilkinson et al. | 200/61.27 |
| 3,914,566 | 10/1975 | Wendling | 200/61.27 |

FOREIGN PATENTS OR APPLICATIONS

| | | | |
|---|---|---|---|
| 563,318 | 5/1957 | Italy | 200/61.37 |

*Primary Examiner*—James R. Scott
*Attorney, Agent, or Firm*—Lon H. Romanski

[57] ABSTRACT

A manually actuatable electrical switch assembly, employable as, for example, a turn signal and emergency warning switch assembly for automobiles, trucks or the like, has a main body or housing carrying electrically openable circuit means the opening and closing of which is controlled by manually rotatable handle means selectively manually positionable to any of a plurality of selected positions for causing electrical energization of corresponding related electrical sensory warning devices; motion transmitting lever means, carried by an adapter body which is operatively secured as between the main body or housing and a cooperating vehicular steering column housing, is effective to cooperate with first abutment means, moved in response to turning of the associated vehicular steering wheel, to transmit a force to second abutment means, operatively carried by the handle means, in order to thereby be effective to at least at times move said handle means from a previously selected position to a position which might be considered as a null position.

19 Claims, 27 Drawing Figures

TURN SIGNAL ASSEMBLY AND SELF-CANCELLING MEANS ATTACHABLE EXTERNALLY TO A STEERING COLUMN POST

BACKGROUND OF THE INVENTION

Generally, in the field of turn signal switch assemblies, the prior art has provided two general types. The first of such types is the self-cancelling type which is usually employed in automobile applications. Such self-cancelling turn signal switch assemblies, when assembled to the vehicle, are generally generally contained within the housing situated about and enclosing the vehicular steering gear shaft which, in turn, is connected to an associated operator-controlled steering wheel and to steering linkage means leading to the vehicular ground engaging steerable wheels. The second of such types is the non-self-cancelling type which is usually employed as in truck applications, both military and commercial. Such non-self-cancelling turn signal switch assemblies, when assembled to the vehicle, are generally strapped or otherwise suitably secured to the exterior of the steering gear shaft housing as to be mounted completely externally of such shaft housing.

The truck industry, generally, desires such turn signal switch assemblies to be thusly externally mounted in that there are appreciable cost savings arising out of, for example, simplicity in the original manufacturing of the turn signal assembly, no requirement to enlarge the steering shaft housing to accommodate the mounting of the switch assembly therein, ease and simplicity of assembling the turn signal switch assembly to the steering shaft housing, and ease of repairing and/or replacing the turn signal switch assembly should such be made necessary as by some internal failure.

However, as a consequence of employing such non-self-cancelling turn signal switch assemblies an obvious short-coming results. That is, the truck operator must always remember to manually reset the turn signal switch assembly to its neutral or null position after the truck has completed a turning operation. Unfortunately, the resetting of the turn signal switch assembly is frequently forgotten and such often leads to the creation of a dangerous driving condition in that operators of other vehicles in the same vicinity are mislead to believe that the subject truck is preparing to undergo a turning operation instead of actually having completed a turning operation. Such misinformation conveyed to such other operators may cause the operators to take action which may be contrary to the safety of all concerned.

Accordingly, the invention as herein disclosed and described is directed primarily to the solution of the problems attendant the non-self-cancelling turn signal assembly and to enable such turn signal assembly to be, in fact, employable as a self-cancelling turn signal assembly.

SUMMARY OF THE INVENTION

According to the invention, a turn signal switch assembly, having a body or housing assembly mountable to the shaft housing of a vehicular steering gear and shaft assembly to which an operator controlled steering wheel is secured, has a motion transmitting member interposed generally between the manually positionable selector lever means of the switch assembly and the shaft housing; the motion transmitting member is then adapted to at times be engaged by actuating means movable in conjunction with rotation of said steering wheel so as to move the lever means from a previously selected position or condition of operation and to a neutral or null position or condition of operation.

Various general and specific objects and advantages of the invention will become apparent when reference is made to the following detailed description considered in conjunction with the accompanying drawings.

BRIEF DESCRIPTION OF THE DRAWINGS

In the drawings, wherein for purposes of clarity certain details and/or elements may be omitted from one or more views.

DETAILED DESCRIPTION OF THE PREFERRED EMBODIMENTS

Figures 1, 2:
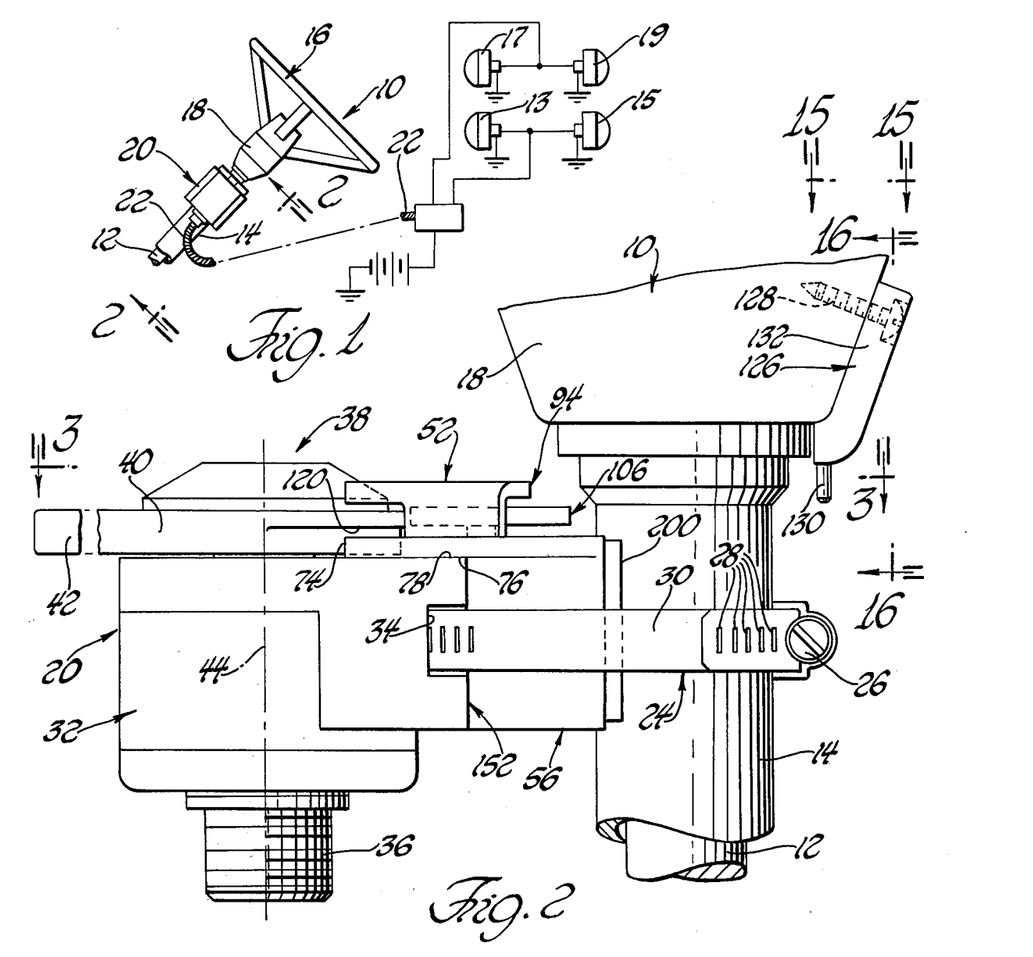
FIG. 1 is a side elevational view of a vehicular steering column assembly with an externally mounted turn signal switch assembly suitably secured thereto.
FIG. 2 is an enlarged fragmentary elevational view taken generally on the plane of line 2—2 of FIG. 1 and looking in the direction of the arrows.

Referring now in greater detail to the drawings, FIG. 1 illustrates vehicular steering means 10 shown as comprising a rotatable steering shaft 12, a steering column housing (sometimes referred to as a steering shaft housing) 14, and an operator controlled steering wheel assembly 16. Hub portion 18 of steering wheel 16 is (as is well known in the art) operatively connected to the upper end of steering shaft 12 while the lower end of shaft 12 is operatively connected to suitable motion transmitting and linkage means leading to the vehicular ground engaging steering wheels. Accordingly, as is well known, rotation of control steering wheel 16 causes corresponding rotation of shaft 12 which, in turn, results in the vehicular ground engaging steering wheels being correspondingly turned as to cause such associated vehicle to undergo a turning operation.

A turn signal switch assembly 20 is shown mounted on and carried by the housing 14. As generally depicted at 22, suitable related electrical conductor means 22 interconnecting the switching assembly to related electrically energizeable means as well as electrical power source means may be, if desired, exposed to view.

FIG. 2, an enlarged fragmentary elevational view taken on the plane of line 2—2 of FIG. 1, illustrates the turn signal switch assembly 20 as being secured to the column housing portion 14, of the steering means 10, as by adjustable clamping means which, in the form illustrated, is an adjustable strap means 24 the clamping length of which is determined as by screw means 26 threadably cooperating with indentations or slots 28 within the strap 30. (The precise configuration of such clamping means forms no part of this invention and any such means, many of which are well known in the art, may be employed.)

Figure 3:
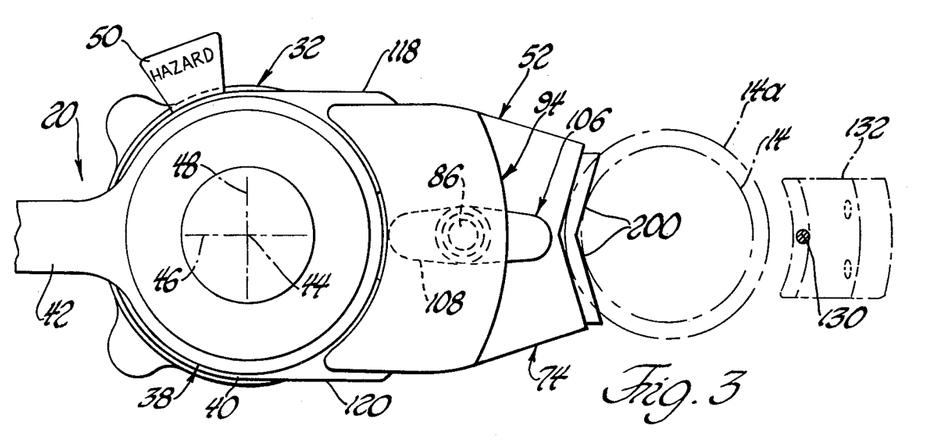
FIG. 3 is a view taken generally on the plane of line 3—3 of FIG. 2 and looking in the direction of the arrows with the associated steering column housing means illustrated in phantom lines.

Generally, as shown in FIGS. 2 and 3, the switch assembly 20 may be comprised of a main body or housing means 32 having suitable aperture means 34, for the reception therethrough of the clamping means 24, and a suitable connector 36, if desired, for accommodating the mechanical locking thereto of related electrical conductor or harness means as generally depicted at 22 of FIG. 1. Manually actuatable handle means 38 situated generally atop housing 32 is depicted as being comprised of a handle body portion 40 and, preferably, an integrally formed handle extension portion 42. Generally, the handle means 38 is rotatable about centerline 44, which is viewed as the intersection of centerlines 46 and 48 of FIG. 3, to and from various positions and modes of operation. An actuatable abutment member 50 may be depressed in order to rotate the lever or handle means 38 to a mode of operation wherein it is desired to signal, for example, a hazard condition to others in the vicinity. Although not believed to be necessary to the understanding of the invention, reference is hereby made to U.S. Pat. No. 3,809,833 granted May 7, 1974, for a complete and detailed description as to how, by way of example and not of limitation, the internal switching structure of the switch assembly 20 may be comprised and as to how, also by way of example and not of limitation, how the member 50 and related structure may be arranged as illustrated, for example, by elements 334, 344, 336, 338, 340 and 348 of FIGS. 1 and 2 of said U.S. Letters Patent 3,809,833.

As also illustrated in FIGS. 2 and 3, adapter means 52 is generally interposed between the switching assembly 20 and the related mounting means which, in the case illustrated, comprises the steering shaft housing 14 or the functional equivalent thereof.

With reference to FIGS. 4, 5, 6, 7 and 8, which illustrate the adapter means 52 in greater detail, it can be seen that the adapter means 52 is shown as comprising a main body 56 having first and second generally opposed end wall means 54 and 58.

Figure 4:
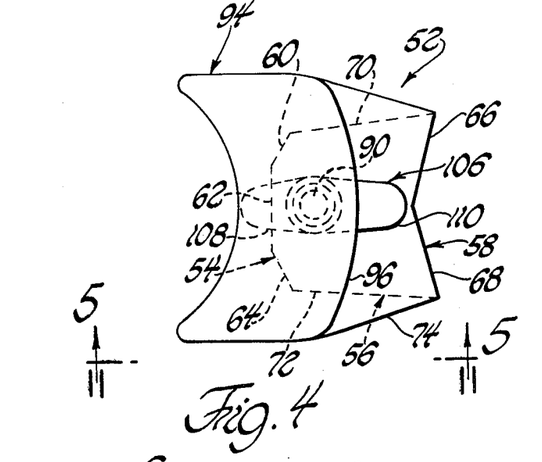
FIG. 4 is a top plan view of one of the sub-assemblies of FIGS. 2 and 3.
Figure 5:
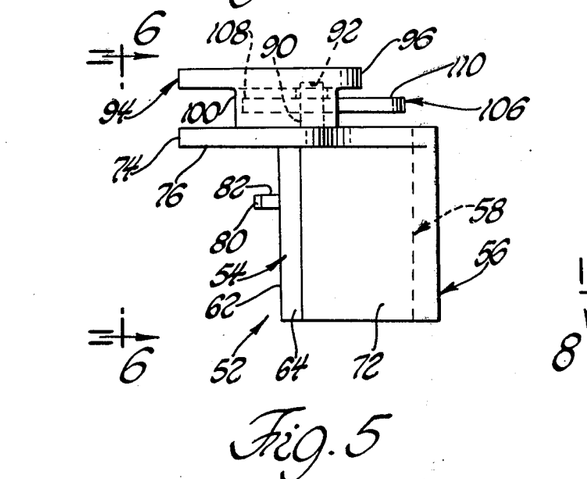
FIG. 5 is a side elevational view taken generally on the plane of line 5—5 of FIG. 4 and looking in the direction of the arrows.
Figure 6:
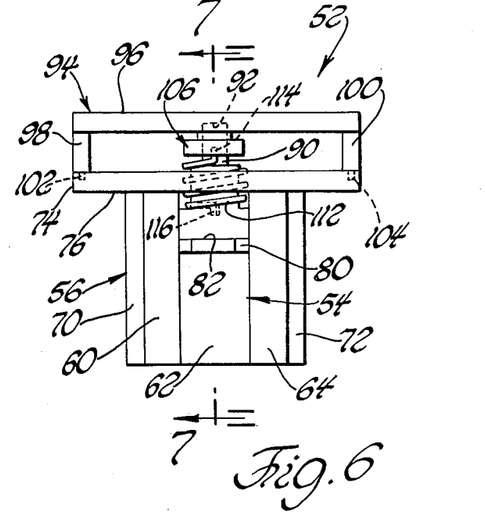
FIG. 6 is an end-elevational view taken generally on the plan of line 6—6 of FIG. 5 and looking in the direction of the arrows.

As shown, wall means 54 is preferably comprised of wall sections or portions 60, 62 and 64 (with portion 60 and 64 being inclined with respect to portion 62 as viewed in FIG. 4) while wall means 58 is preferably comprised of wall portions 66 and 68 inclined with respect to each other. The wall means 58 thereby defines mounting surface means whereby the adapter body means 56 may be mounted as to the steering shaft housing 14 while the wall means 54 defines against which the body or housing 32 of turn signal switch assembly 20 may be operatively mounted. As seen in each of FIGS. 4, 5, 6, 7 and 8, wall sections 60 and 66 are each joined to side wall 70 while wall sections 64 and 68 are each joined to an opposite side wall 72.

Preferably, the upper end of adapter body 56 is provided with an integrally formed laterally extending flange portion 74 the under-surface 76 of which, as shown in FIG. 2, rests atop cooperating upper surface means 78 of turn signal switch housing means 32. A second lower disposed flange or abutment portion 80 is preferably integrally formed with body 56 and the upper surface 82 thereof is adapted to coact with means associated with switch housing 32 in a manner to be described.

Figure 7:
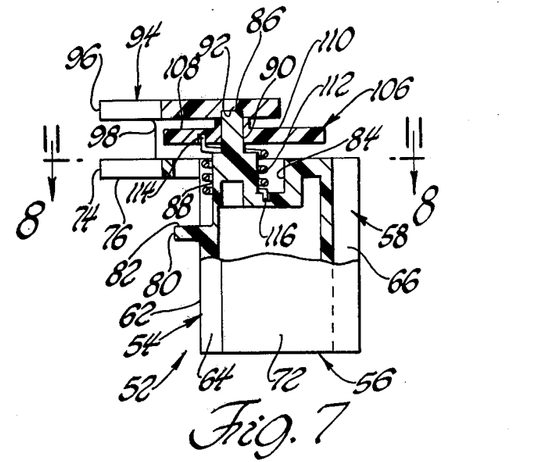
FIG. 7 is a vertical cross-sectional view, with portions shown in side elevation, taken generally on the plane of line 7—7 of FIG. 6 and looking in the direction of the arrows.
Figure 8:
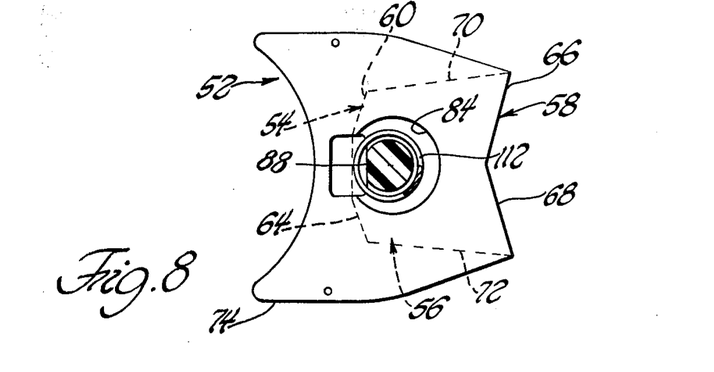
FIG. 8 is a view taken generally on the plane of line 8—8 of FIG. 7 and looking in the direction of the arrows.

Even though the adapter body 56 may be constructed in any suitable manner, in the preferred embodiment shown, the adapter body 56 is integrally molded of plastic material, such as, for example, thermoplastic carbonate-linked polymers. As illustrated in FIGS. 7 and 8 an annular recess 84 is formed generally in the upper surface of body 56 along with a generally centrally located upwardly extending member 86 which thereon defines a first lower relatively enlarged spring locator portion 88 and an upper relatively smaller diameter pivot or journal portion 90. As shown in each of FIGS. 5, 6 and 7 the upper end of pivot portion 90 is preferably closely received within a cooperating aperture or recess 92 formed in the underside of a bridging-like cover member or support 94. Although not essential to the practice of the invention, in the preferred embodiment such a cover-like member 94 is provided and comprises a generally laterally extending bridge-like portion 96 with downwardly depending leg portions 98 and 100 at opposite ends thereof. Further, in the preferred embodiment, pin portions 102 and 104 are respectively formed on leg portions 98 and 100 as to be, when assembled, received within cooperating apertures formed in flange 74 where they may be suitable secured as by, for example, cementing or heat fusion.

A motion transmitting lever 106, is provided with an aperture for pivotal mounting on and about journal or pivot pin 90. Lever means 106, comprised of lever arms 108 and 110, is operatively connected to related spring means 112 as to normally seek a position as generally depicted in FIGS. 3, 4, 5, 6 and 7. That is, for example, lever arm 108 may be operatively connected to a moveable one end 114 of torsion spring 112 which, in turn, has its other end 116 secured against movement as by a receiving aperture formed in body 56.

As partly illustrated in FIGS. 2 and 3 and as further illustrated in FIGS. 9, 10, 11 and 12, the body 40 of lever means 38 is provided with generally laterally extending protrusions or abutment means 118 and 120 respectively provided with abutment surfaces 122 and 124 generally opposed to each other and spaced from each other. Such abutment means 118 and 120 rotate with body 40 and, in so doing, pass generally between transverse bridging portion 96 of cover-like member 94 and the top of flange 74 of the associated body 56 and as to be in a plane or path of travel whereby abutment surfaces 122 and 124 are in functional juxtaposition to the lever arm 108 of lever means 106.

Referring to FIGS. 2 and 3, it can be seen that the steering wheel hub 18 is provided with an actuator body and pin assembly 126 secured to the hub 18, as by screws 128, for rotation therewith. The body and pin assembly, also shown in FIGS. 15 and 16 will be subsequently described. At this point, it will suffice to say that pin 130, carried by body 132 rotates with hub 18 in a path generally passing through arm 110 of lever 106 as depicted in FIG. 2.

In each of FIGS. 9, 10, 11 and 12, the circular centerline 134 indicates the path of movement, of the centerline of pin 130, as the pin 130 is rotated 360° due to corresponding rotation of the steering wheel 16 and hub 18. Further, in each of FIGS. 9, 10, 11 and 12, arrows 136 and 138 respectively indicate the direction of rotation of steering wheel 16 and hub 18, along with the direction of movement of actuator means or pin 130, for affecting left and right turns of the associated vehicle.

Figure 9:
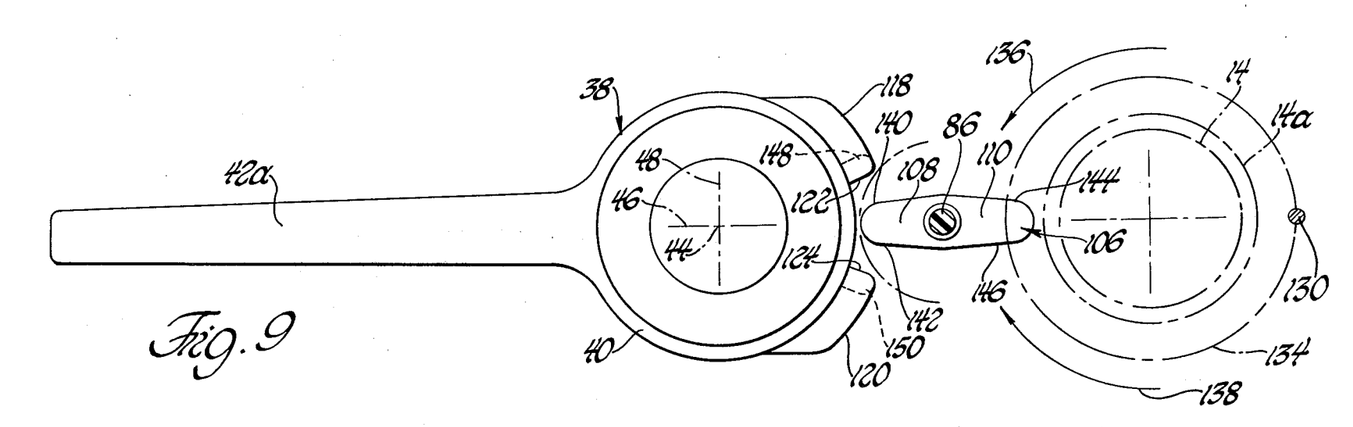
FIGS. 9, 10, 11 and 12 are each simplified views of the structure shown in FIG. 3 and respectively illustrating different operational modes.

In FIG. 9, the handle means 38 of the turn signal switch assembly 20 is shown in its neutral position as generally depicted at 42a. This is the position the turn signal switch assembly 20 assumes when the vehicle operator is neither anticipating nor causing the associated vehicle to undergo a turning operation. It should be noted that in the event the steering wheel 16 is turned more than 180° in the directions indicated by either 136 or 138 pin or actuator means 130 will contact lever means 106 and cause lever means to rotate either clockwise or counter-clockwise about pivot 86. However, in so doing, the swinging end of lever arm 108 swings as to miss engaging either abutment surfaces 122 or 124, as the case may be. Accordingly, it can be seen that whenever lever or arm means 38 is in a neutral position no amount of rotation of steering wheel means 16 will result in any motion of such turn signal arm means 38.

Figure 10:
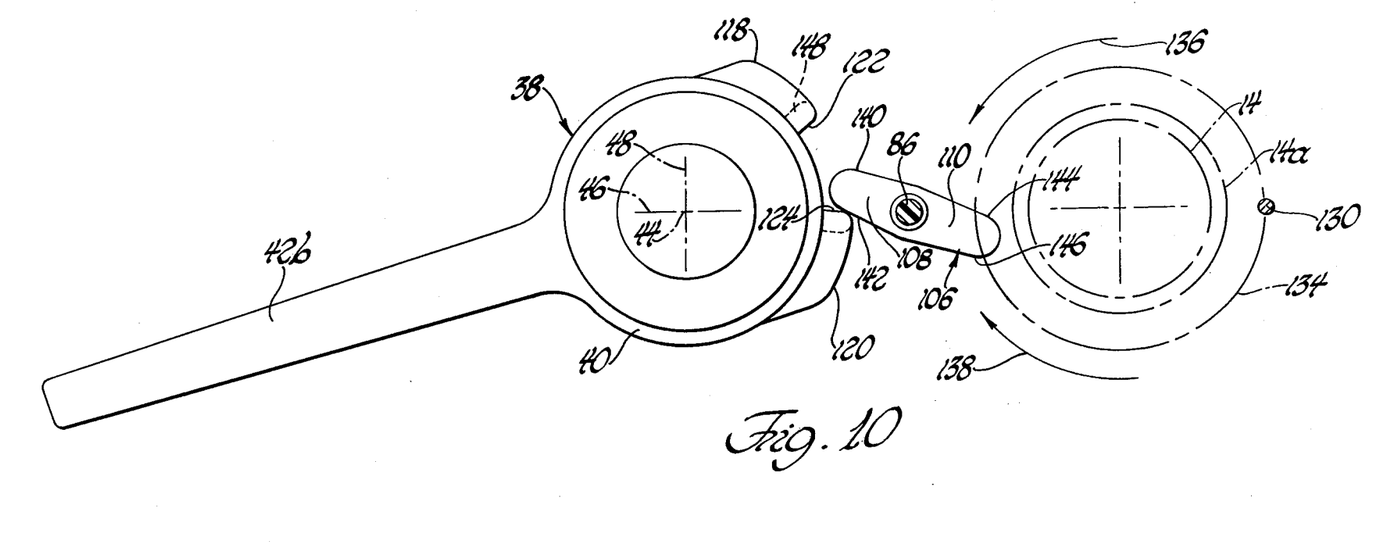

If it is now assumed that the vehicle operator wishes to make a left turn and to indicate his intentions to other vehicle operators in the vicinity, as by the intermittent energization of the left front and left rear vehicle indicator lamps 13 and 15 of FIG. 1, the operator rotates the turn signal arm means 38 to the position generally depicted at 42b of FIG. 10. It will be noted that in such a condition of operation abutment means 120 has also been correspondingly rotated counter-clockwise about axis 44 as to thereby cause abutment surface 124 to engage side 142 of lever arm 108 and rotate lever means 106, against the resilient resistance of spring means 112, clockwise about pivot means 86 to the position generally depicted in FIG. 10. It can be seen that if, after movement of lever means 38 to position 42b, the steering wheel means 16 and actuator means 130 are turned in the left-turn direction of arrow 136, actuator 130 will strike edge or side 144 of lever arm 110 and, with continued motion in direction 136, rotate lever means 106 in the clockwise direction about pivot 86, further from that shown in FIG. 10, until actuator 130 passes by the further-rotated end of lever arm 110. Once the actuator 130 thusly passes lever arm 110, spring means 112 resiliently urges and returns lever means 106 to the position shown in FIG. 10. It should be observed that such further clockwise rotation of lever means 106 as occassioned by the actuator 130 in no way alters the previously manually selected position of switching lever or arm means 38 because, during such time, lever arm 108 swings free of abutment means 118.

Still referring to FIG. 10, let it now be assumed that instead of wheel assembly 16 and actuator 130 being rotated in the left-turn direction of arrow 136, such are being rotated in the right-turn direction of arrow 138. Under such assumed condition it can be seen that actuator means 130 will strike or engage side or edge 146 of lever arm 110 and that with further movement of the steering wheel 16 and actuator means 130 in such a direction, the actuator means 130 will forcibly rotate lever means 106 in a counter-clockwise direction about pivot means 86. In so doing, side or edge 142 of lever arm 108 reacts against abutment surface means 124 and abutment means 120 thereby forcing control arm means 38 in the clockwise direction about its axis 44. The turn signal switch control arm means 38 will thusly rotate about axis 44 until it reaches its neutral position as depicted at 42a of FIG. 9, at which position lever means 106 becomes incapable of exhibiting any further moving force against control arm means 38. It should be mentioned that there may well be means associated with or comprising the overall switch assembly 20 which serve to tend to hold control arm means 38 in any or all of its plurality of positions including its neutral position. Such means, as is well known in the art, may take the form of detent-like means which not only serve to provide a degree of resilient resistance to the movement of the control arm means 38 from a selected position but also provide a resilient force tending to move the control arm means into the next selectable position as the control arm means is being moved toward and nearly approaches such next selectable position.

Figures 11, 12:
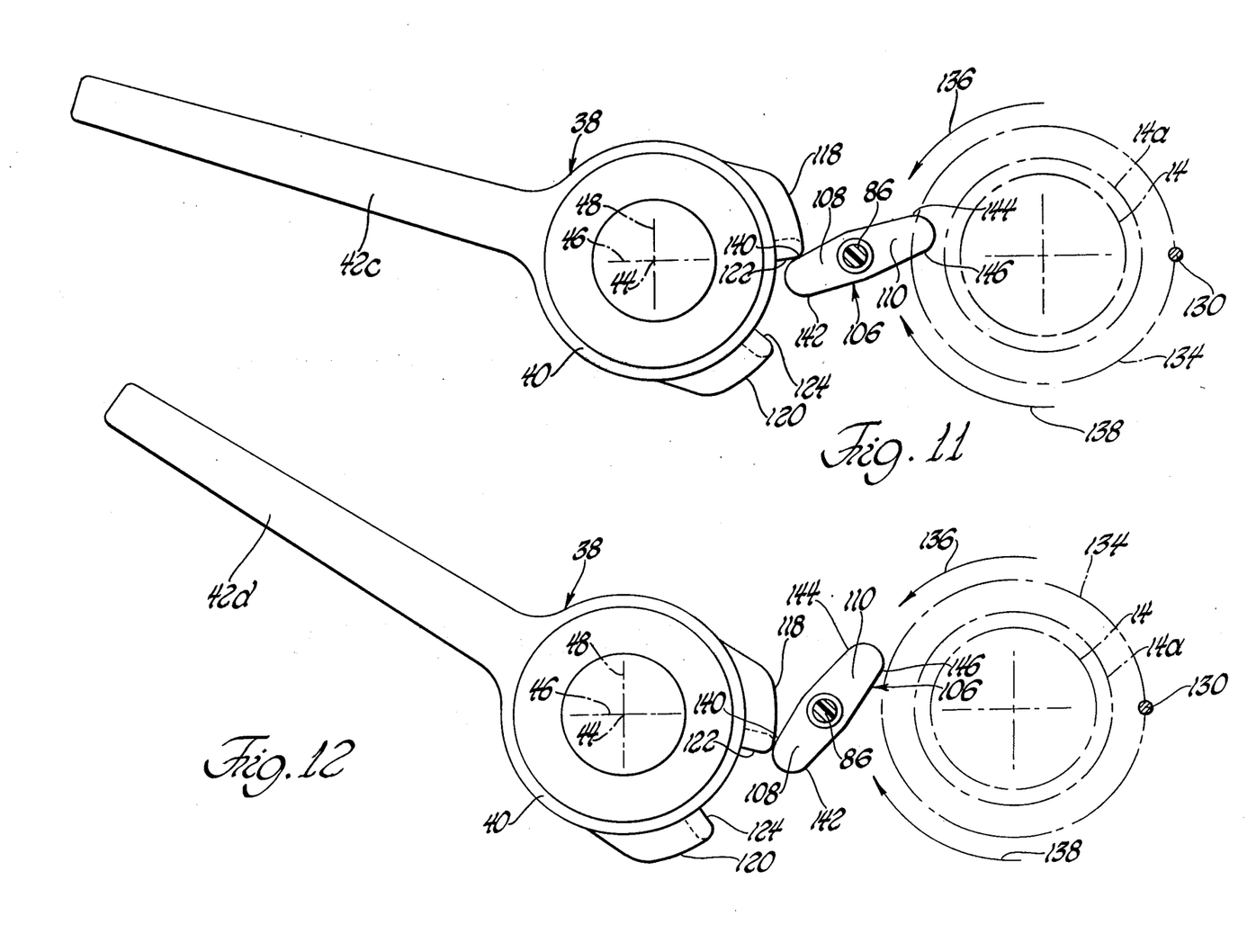

If it is now assumed that the vehicle operator wishes to make a right turn and to indicate his intentions to other vehicle operators in the vicinity as by the intermittent energization of the right front and right rear vehicular indicator lamps 17 and 19 of FIG. 1, the operator rotates turn signal arm means 38 to the position generally depicted at 42c of FIG. 11. It will be noted that in such a condition of operation abutment means 118 has also been correspondingly rotated clockwise about axis 44 as to thereby cause abutment surface 122 to engage side or edge 140 of lever arm 108 and rotate lever means 106, against the resilient resistance of spring 112, counter-clockwise about pivot means 86 to the position generally depicted in FIG. 11. It can be seen that if, after movement of control lever means 38 to position 42c, the steering wheel means 16 and actuator means 130 are turned in the right-turn direction of arrow 138, actuator 130 will strike or engage side or edge 146 of lever arm 110 and, with continued motion in direction 136, rotate lever means 106 in the counter-clockwise direction about pivot 86, further from that shown in FIG. 11, until actuator 130 passes by the further-rotated end of lever arm 110. Once the actuator 130 thusly passes 110, spring means 112 resiliently urges and returns lever means 106 to the position shown in FIG. 11. It should be observed that such further counter-clockwise rotation of lever means 106 as occassioned by the actuator 130 in no way alters the previously manually selected position of selector lever means 38 because, during such time, lever arm 108 swings free of abutment means 120.

Still referring to FIG. 11, let it now be assumed that instead of wheel assembly 16 and actuator means 130 being rotated in the right-turn direction of arrow 138, such are being rotated in the left-turn direction of arrow 136. Under such assumed condition it can be seen that actuator means 130 will strike or engage side or edge 144 of lever arm 110 and that with further movement of the steering wheel 16 and actuator means 130 in such a direction, the actuator means 130 will forcibly rotate lever means in a clockwise direction about pivot means 86. In so doing, side or edge 140 of lever arm 108 reacts against abutment surface means 122 and abutment means 118 thereby forcing control or selector arm means 38 in the counter-clockwise direction about its axis 44. The turn signal selector lever means 38 will thusly rotate about axis 44 until it reaches its neutral position as depicted at 42a of FIG. 9, at which position lever means 106 becomes incapable of exhibiting any further moving force against selector lever means 38.

If it is now assumed that the vehicle operator wishes to indicate to others in the vicinity a hazard condition as by the intermittent flashing or energization of both front indicator lamps 13 and 17 and both rear indicator lamps 15 and 19, the operator will rotate selector lever means 38 clockwise about the axis 44 until such means 38 attain the position generally depicted at 42d of FIG. 12. In so doing, it should be noted that abutment means 118 has likewise been rotated clockwise to the position indicated in FIG. 12 thereby engaging lever arm 108 of lever means 106 and rotating lever means 106, counter-clockwise about support pivot means 86, to the position depicted in FIG. 12.

It should be noted in comparing FIGS. 11 and 12 that in FIG. 12 the selector lever means 38 and abutment means 118 have been rotated further than the selector lever means 38 and abutment means in FIG. 11 and that in FIG. 12 lever means 106 has also been rotated further than lever means 106 in FIG. 11. As a consequence of such comparatively further rotation of lever means 106, the swingable end of lever arm 110 is moved to a position whereby even 360° rotation of steering wheel assembly 16 and actuator means 130, in either of the directions represented by 136 or 138, will not cause operational engagement as between actuator 130 and lever arm 110. In the remote event some engagement does occur, it will only cause the further counter-clockwise rotation of lever means 106 from the position shown in FIG. 12, and, obviously, such further rotation will not effect the position of selector arm means 38.

Figure 13:
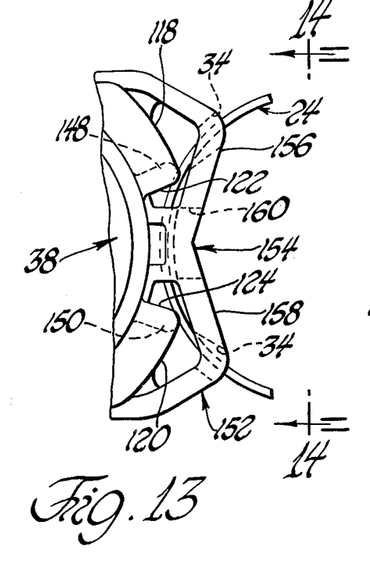
FIG. 13 is a slightly enlarged fragmentary top plan view of the turn signal switch assembly of FIG. 3.
Figure 14:
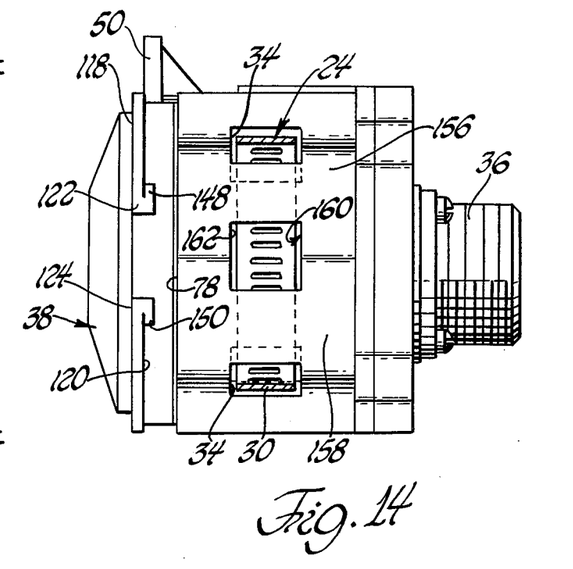
FIG. 14 is an end elevational view taken generally on the plane of line 14—14 of FIG. 13 and looking in the direction of the arrows.

FIG. 13 illustrates in slightly enlarged fragmentary view the top plan view of the switching assembly 20 shown in FIGS. 1, 2 and 3, while FIG. 14 is a view taken generally on the plane of line 14—14 of FIG. 13. Relative to FIGS. 13 and 14 it can be seen that the preferred embodiment comprises flanges 118 and 120 provided with enlarged generally downwardly depending integrally formed portions 148 and 150, respectively, which serve to increase the surface area of abutment surface means 122 and 124, respectively, as well as to add strength to the abutment means 118 and 120.

Further, as shown in both FIGS. 13 and 14, end 152 of switch housing 32 may be provided with mounting surface means 154 comprised as of surface portions 156 and 158 which are inclined with respect to each other. Also, preferably, a cut-out or aperture 160 is formed generally medially of surface means 154 with such aperture 160 having an upper end surface 162. In the embodiment and arrangement disclosed by FIGS. 1–12, the cancelling means 52 is generally vertically interlocked with turn signal switch assembly as by means of the lower surface 76 of flange 74 resting against the upper surface 78 of housing 32 while the upper surface 82 of tab or flange 80 is held against upper edge or surface 162 of aperture 160 of FIG. 14. This arrangement enhances the relative stability of the assembled assemblies 20 and 52 when collectively secured as to the column housing 14.

Figure 15:
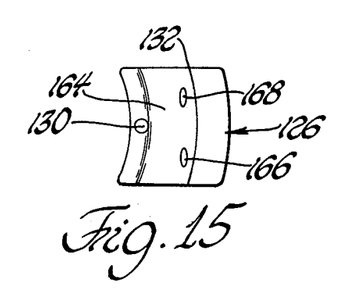
FIG. 15 is a top plan view, of one form of actuator means, taken generally on the plane of line 15—15 of FIG. 2 and looking in the direction of the arrows.
Figure 16:
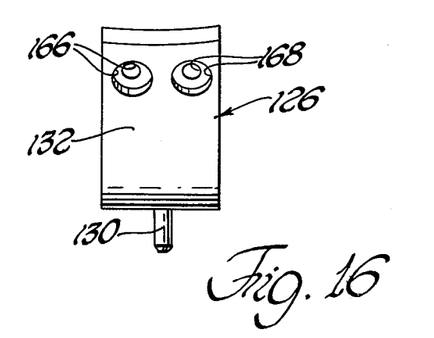
FIG. 16 is an elevational view, of the actuator means of FIG. 15, taken generally on the plan of line 16—16 of FIG. 2 and looking in the direction of the arrows.

Referring to FIGS. 1, 15 and 16, the actuator means 126 is illustrated as comprising a main body 132 which has its inner surface 164 preferably contoured as to be complementary to the contour of the outer surface of steering wheel hub 18. The actuater pin 130 may either be a separate member secured to and carried by body 132 or integrally formed therewith. Obviously, the body 132 and pin 130 may be formed of any suitable material. Preferably, a pair of recesses and clearance apertures 166 and 168 for the reception therethrough of screws 128 by which such actuator assembly 126 may be detachably secured as to the wheel hub means 18.

Figure 17:
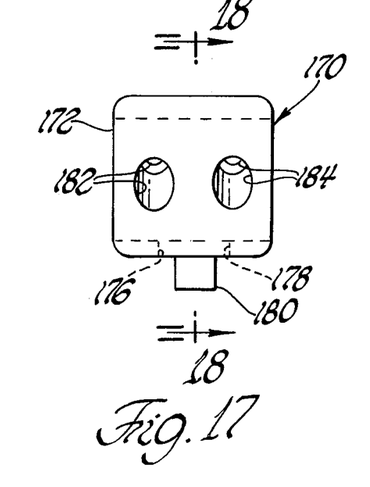
FIG. 17 is view similar to that of FIG. 16 but illustrating a second form of actuator means.
Figure 18:
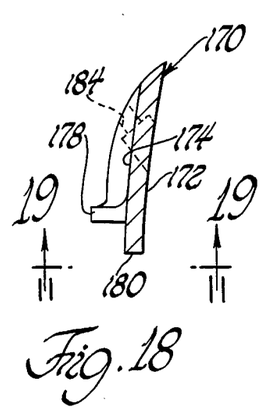
FIG. 18 is a cross-sectional view taken generally on the plane of line 18—18 of FIG. 17 and looking in the direction of the arrows.
Figure 19:
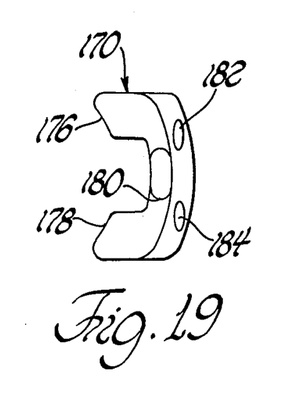
FIG. 19 is an end elevational view taken generally on the plane of line 19—19 of FIG. 18 and looking in the direction of the arrows.

FIGS. 17, 18 and 19 illustrate another embodiment of actuator means 170 shown as comprising a main body 172 having an inner contoured surface 174 for mounting as against a complementary surface of the hub means 18, generally laterally extending flange portions 176 and 178 as for abutting against the lower end of a hub 18, an integrally formed actuator member 180 and a pair of recesses and clearance apertures 182 and 184 functionally equivalent to 166 and 168.

Figure 20:
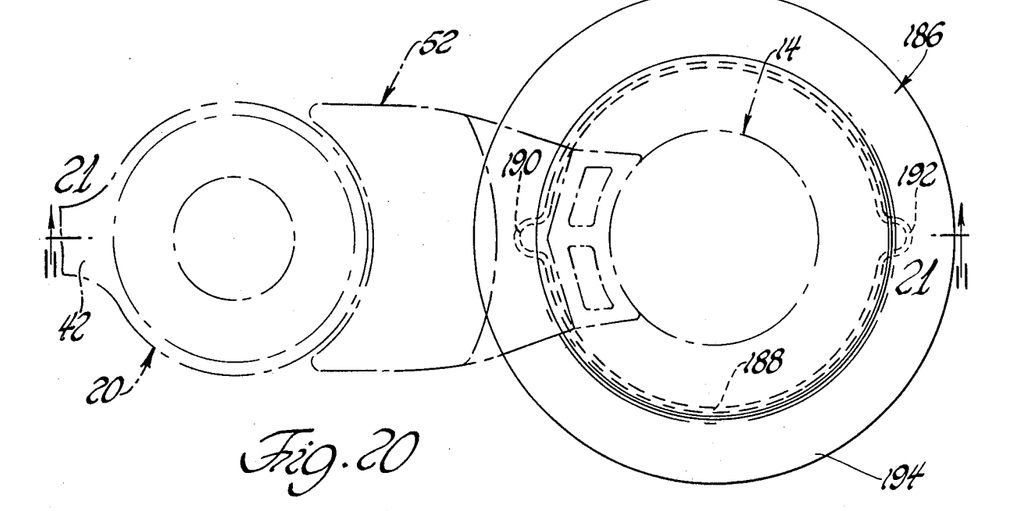
FIG. 20 is a top plan view of still another form of actuator means.
Figure 21:
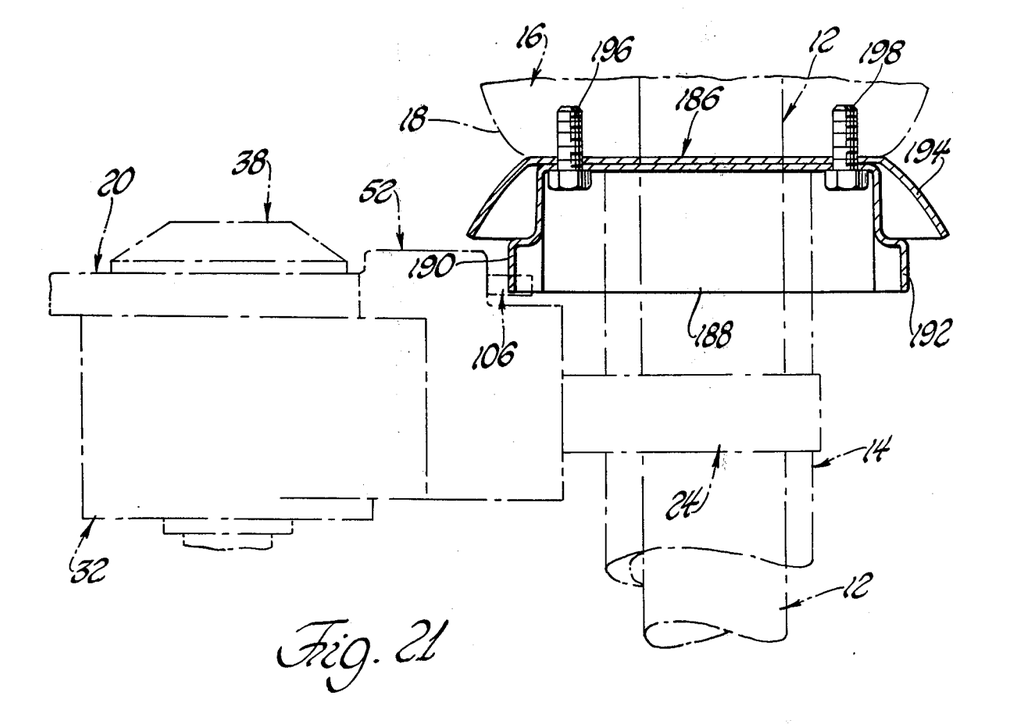
FIG. 21 is a cross-sectional view taken generally on the plane of line 21—21 of FIG. 20 and looking in the direction of the arrows.

FIGS. 20 and 21 illustrate another form of actuator means 186. As shown, such actuator means may comprise an inverted cup-like member 188 with integrally formed radially outwardly extending diametrically opposed arm-like portions or abutments 190 and 192. A generally dished shroud or cover-like member 194 may be placed atop cup-like actuator 188 as to even have its outer edge extending over the lever means 106. As generally indicated, cup-actuator 188 and shroud 194 may be secured to associated steering wheel means 16 as by screws 196 and 198 while, of course, the steering wheel means is, in turn, operatively secured to the steering shaft means 12. With the arrangement as shown in FIGS. 20 and 21 protrusions or actuator portions 190 and 192 will each, for every 360° of rotation of the steering wheel means 16, engage the lever means 106.

As shown by FIGS. 2–14, mounting surfaces 156 and 158 of housing 32 are adapted to receive thereagainst the surfaces 60, 64 of cancellation means body 56 when operatively connected to each other. Further surfaces 66 and 68 are adapted to receive thereagainst the associated support structure as column housing 14. However, surfaces 66 and 68 may also be provided with suitable shimming means 200 so as to accommodate, for example, a housing 14 of relatively smaller diameter while still enabling the accommodation, as either with a thin shim or no shim at all, a housing of relatively larger diameter as depicted at 14a. This, as a practical matter might be highly desirable where, for example, the radius of rotation of actuator pin 130 must be of a certain magnitude. In such situation where the said radius of rotation cannot be altered and such radius would cause the actuator pin 130 to engage lever means 106 at a point too close to the axis of pivotal rotation of lever means 106, shims such as at 200 may be employed to in effect increase the distance between the axis of pivotal rotation of lever means 106 and the axis of the radius of rotation of pin 130.

Figure 22:
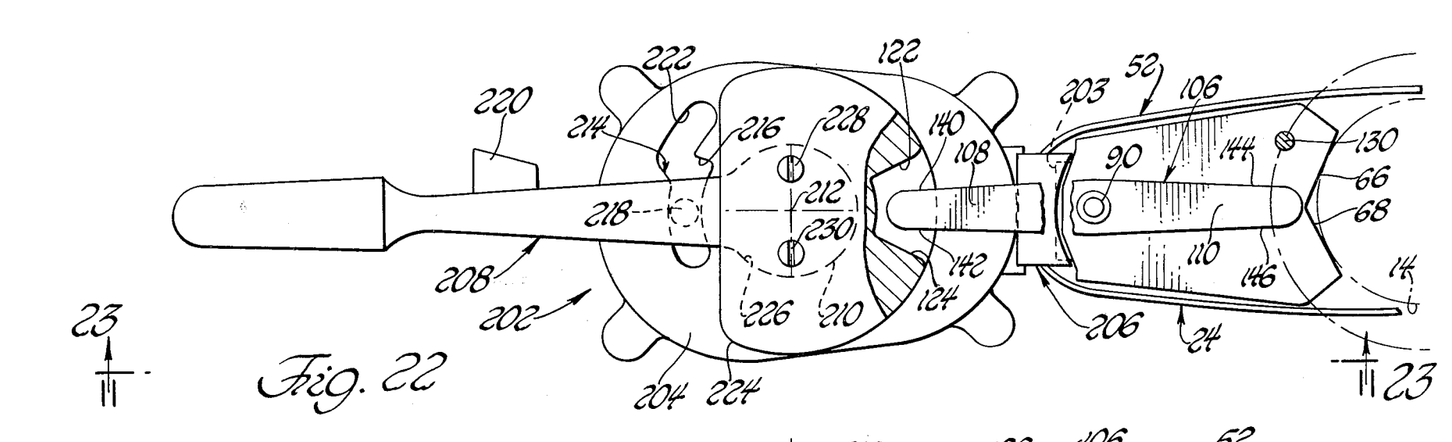
FIG. 22 is a view similar to that of FIG. 3 but illustrating another embodiment of the invention.

In view of the foregoing, it should be apparent that the invention may be practiced even by providing adaptive components to those prior art turn signal switch assemblies already in use. For example, referring to FIGS. 22 and 23, a turn signal switch assembly 202, a type known in the prior art, has housing means 204 including mounting bracket means 206, carried by the housing means 204, for mounting against a column housing 14 as with clamping strap means 24. (Certain of the elements in FIGS. 22 and 23 which are like, similar or functionally equivalent to those of preceding Figures are identified with like reference numbers.) The turn signal switch assembly 202 is of the type wherein the control handle means 208 has a relatively small terminal body 210 pivotally selectively positionable about its axis 212. Just as in, for example, FIGS. 2, 3, 9, 10, 11 and 12, control handle means 208 is selectively positionable to any of various operating positions with that, as shown in FIG. 22, being the neutral position. Turn signal assembly 202, is provided with arcuate slot means 214 radially stepped as to provide, in effect, an abutment 216 against which a pin follower 218 strikes when the control arm means 208 is moved as to a right-turn indicating position. The pin follower 218 is operatively connected to a movable de-latching control member 220 which, when actuated, moves the pin follower 218 into the stepped arcuate slot portion 222 thereby enabling the further rotation of control lever 208 to a hazard indicating warning position.

Figure 23:
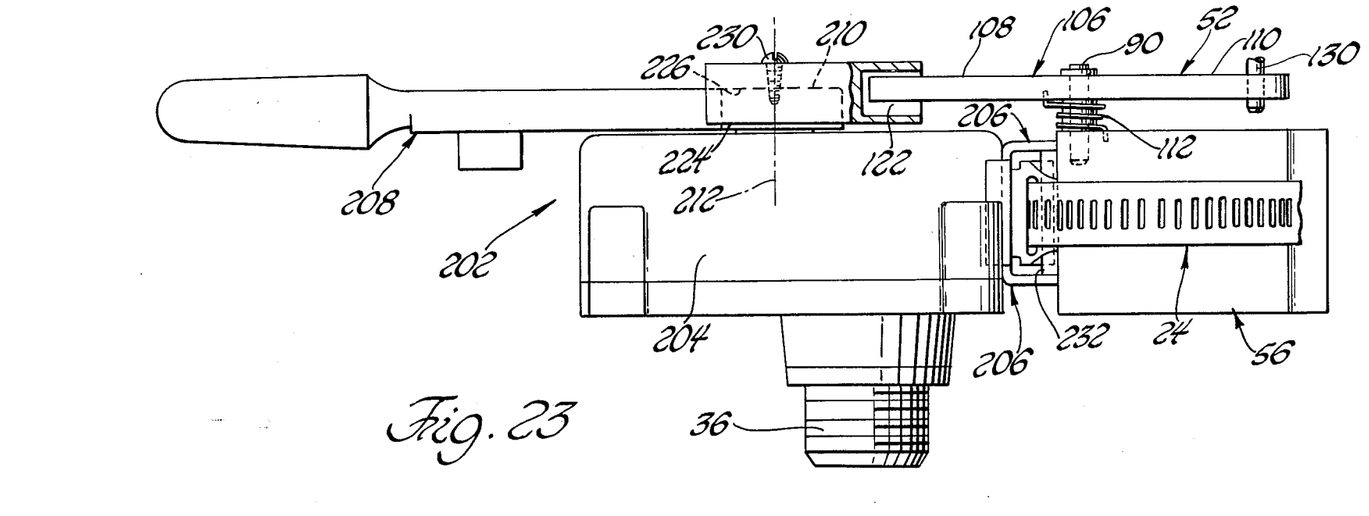
FIG. 23 is a side elevational view taken generally on the plane of line 23—23 of FIG. 22 and looking in the direction of the arrows.

With canceling means as generally indicated at 52 of FIGS. 22 and 23, all that needs to be done is to secure suitable coacting abutment means to the control handle means. This may be achieved as by a cover-like adapter body 224 provided with a recess 226 for accommodating the reception of lever body 210. Suitable means such as screws 228, 230 may be employed for fixedly securing the adapter body 224 to control lever means 208 for movement therewith.

The adapter body 224, in turn, carries abutment means or surfaces 122 and 124 which coact with lever means 106 in the manner described with reference to FIGS. 9, 10, 11 and 12.

If desired, body 56 of FIGS. 22 and 23 may be provided with an extension 232 which could be vertically closely contained as between the upper and lower portions of bracket means 206.

Figure 24:
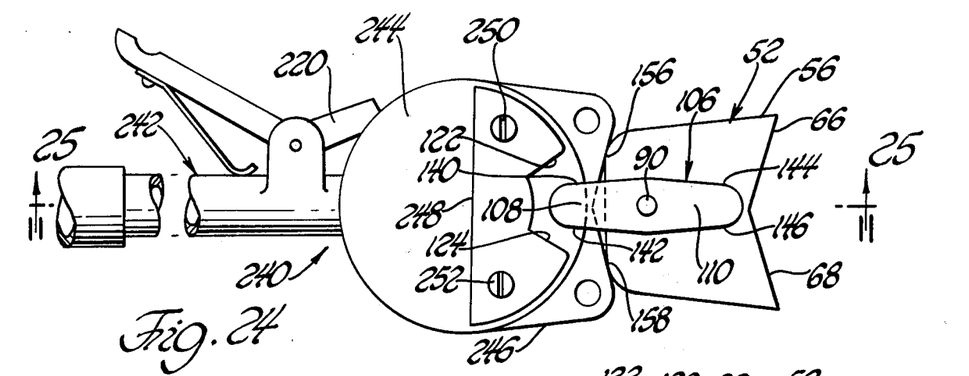
FIG. 24 is a view similar to FIGS. 3 and 22 but illustrating another embodiment of the invention.
Figure 25:
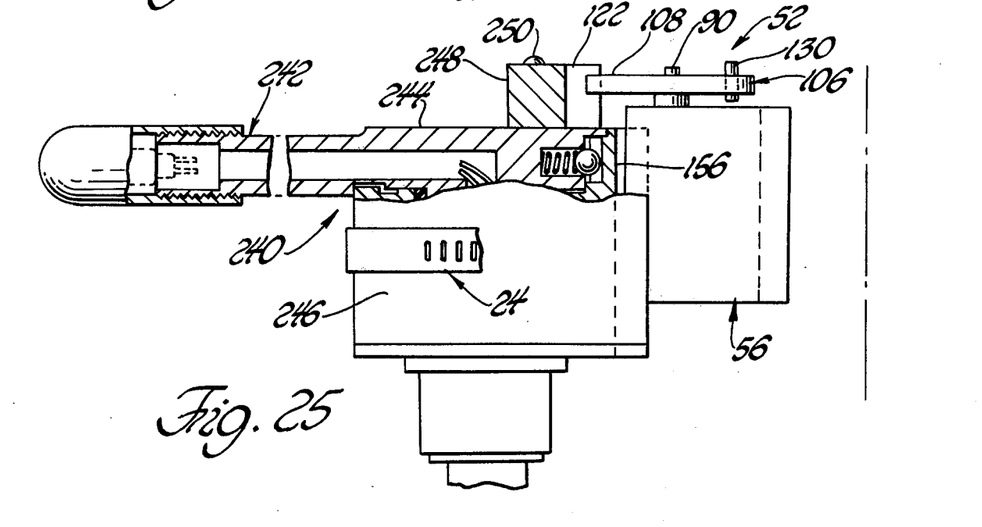
FIG. 25 is a side elevational view of the embodiment of FIG. 24 with portions thereof in cross-sectional and such cross-sectional positions being viewed generally along the plane 25—25 of FIG. 24 and looking in the direction of the arrows.

FIGS. 24 and 25 illustrate another configuration or type of turn signal switch assembly 240 known in the prior art but adapted to employ the teachings of the invention. (Although not believed necessary to the understanding of the operation of the invention, the basic turn signal assembly 240 is disclosed in detail in U.S. Pat. No. 3,591,740 granted July 6, 1971.) Certain of the elements in FIGS. 24 and 25 which are like, similar of functionally equivalent to those of any of the preceding Figures are identified with like reference numbers.

In the embodiment of FIGS. 24 and 25 the control lever means 242 has a comparatively large terminal rotatable body 244 generally, at least partly, received within housing means 246. Accordingly, all that needs to be done to modify the turn signal assembly 240 in order to practice the invention is to provide abutment means or surfaces 122, 124 which may be carried on or by an adapter body 248 secured to control arm body 244, for rotation therewith, as by screws 250 and 252. The operation of the invention as shown in FIGS. 24 and 25 would, of course, be as that described with reference to prior Figures.

Figure 26:
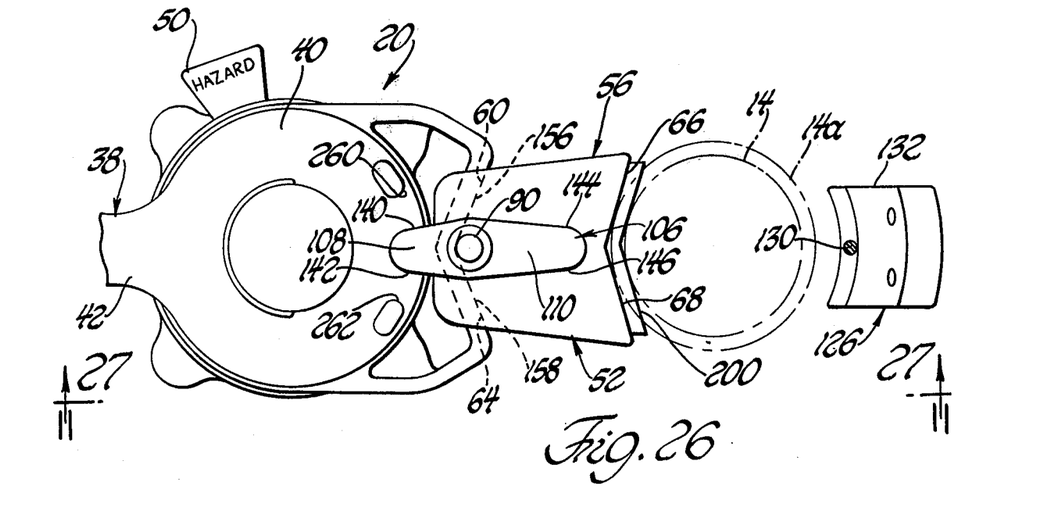
FIG. 26 is a view similar to FIGS. 3, 22 or 24 but illustrating still another embodiment of the invention.
Figure 27:
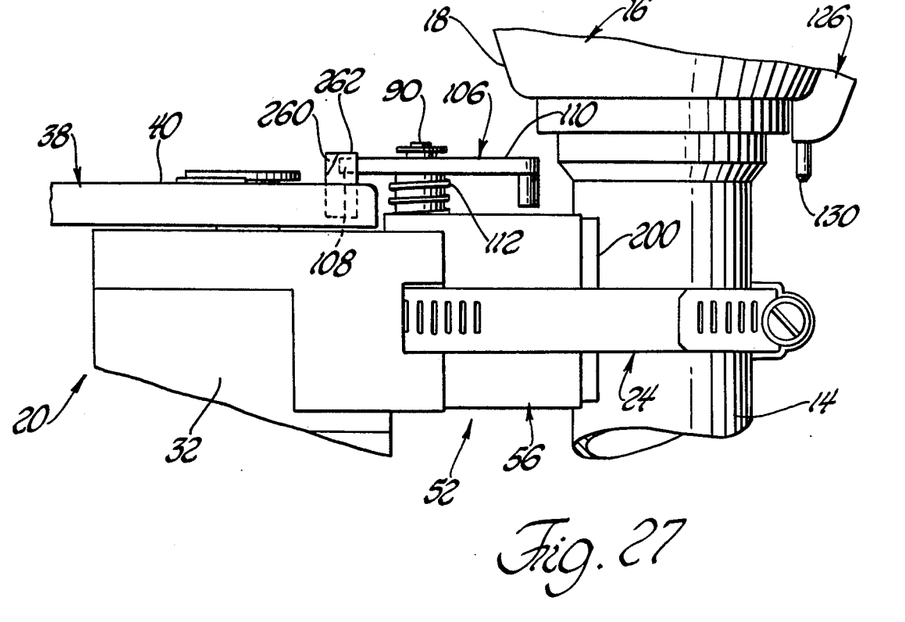
FIG. 27 is a view taken generally on the plane of line 27—27 of FIG. 26 and looking in the direction of the arrows.

FIGS. 26 and 27 illustrate another manner of adapting an otherwise prior art turn signal assembly to practice the invention. Certain of the elements which are like, similar or functionally equivalent to, elements of preceding Figures are identified with like reference numbers. In FIGS. 26 and 27 the control arm body 40 of the control lever means 38 is provided with upstanding abutments 260, 262 which are respectively spaced from each other but fixed to arm body 40 for rotation therewith. Such abutments may be, if desired, integrally formed or, as shown more clearly in FIG. 27, inserted into cooperating apertures formed in body 40. Of course, abutments 260 and 262 would be respectively functionally equivalent to abutment surfaces 122 and 124 and therefore cooperate with lever means 106 in the manner previously described.

Although only a preferred embodiment and a select number of modifications of the invention have been disclosed and described, it is apparent that other embodiments and modifications of the invention are possible within the scope of the appended claims, as, for example, it is quite possible in view of the teachings of this invention, to actually form and include the canceling mechanism 52 to be an integral part of the switch housing means 32 and the actuator 130, or the functional equivalent thereof, could also be an integral portion of the related steering wheel means 16.

I claim:

1. A turn signal switch and assembly for an associated vehicle having manually controlled vehicular steering gear means and steering gear column housing means, comprising turn signal switch housing means for enclosing and containing actuatable electrical switching members therein, rotatable selector lever means carried by said switch housing means generally externally thereof, said selector lever means being selectively manually rotatably positionable into a neutral position and any of a plurality of operating positions as to thereby accordingly actuate said switching members within said switch housing means, abutment means operatively carried by said selector lever means as to be situated externally of said switch housing means, motion transmitting means situated generally externally of said switch housing means and having a first portion in operative juxtaposition to said abutment means, said motion transmitting means further comprising a second portion adapted to be at times operatively engaged by actuating means moving in response to indicia of said steering gear means being actuated to steer said associated vehicle in a non-linear path, said actuating means being effective when said selector lever means has been selectively positioned in one of said operating positions corresponding to a left-turn operation of said associated vehicle and when said steering gear means is being actuated in a right-turn direction to engage said motion transmitting means and thereby forcibly cause said motion transmitting means to react against said abutment means to thereby cause said selector lever means to be rotated from said one of said operating positions to said neutral position, and support body means situated externally of said switch housing means, said support body means being separate from said switch housing means and effective to support said motion transmitting means, said support body means comprising first mounting surface means effective for operative mounting engagement with said column housing means externally thereof and second mounting surface means effective for operative mounting engagement with said switch housing means as to thereby position said switch housing means externally and eccentrically of said column housing means.

2. A turn signal switch and assembly according to claim 1 and further comprising pivot means carried by said support body means, wherein said motion transmitting means comprises force-transmitting lever means pivotally mounted to said pivot means, and wherein said pivot means has an axis of rotation generally parallel to the axis of rotation of said rotatable selector lever means.

3. A turn signal switch and assembly according to claim 1 wherein said abutment means is formed integrally with said rotatable selector lever means, and wherein said abutment means comprises first abutment surface means and second abutment surface means, said first and second abutment surface means being spaced from each other.

4. A turn signal switch and assembly according to claim 1 wherein said motion transmitting means comprise a lever member pivotally carried and supported by said support body means and effective when said selector lever means has been selectively positioned in another of said operating positions corresponding to a right-turn operation of said associated vehicle and said steering gear means is being actuated in a left-turn direction to thereby engage said lever member and thereby forcibly cause said lever member to react against said abutment means to thereby cause said selector lever means to be rotated from said other of said operating positions to said neutral position.

5. A turn signal switch and assembly according to claim 4 wherein said lever member is engaged and rotated by said abutment means to a further position when said control lever means is rotated to a third of said plurality of operating positions whereat associated indicating means become effective for signaling a hazard condition, said lever member being effectively held in said further position by said abutment means and being pivotally rotated a distance sufficient as to prevent any operative engagement between said lever member and said actuating means regardless of said steering gear means being actuated to steer said associated vehicle in a non-linear path.

6. A turn signal switch and assembly according to claim 4 and further comprising spring means operatively connected to said support body and said lever member for urging said lever member to a null position.

7. A turn signal switch and assembly according to claim 1 wherein said abutment means comprises first and second abutment portions integrally formed with and extending generally laterally and radially outwardly of said selector lever means.

8. A turn signal switch and assembly according to claim 1 wherein said abutment means comprises first and second abutment surface means carried by said selector lever means, wherein said first portion of said motion transmitting means is situated generally between said first and second abutment surface means, and resilient means operatively connected to said motion transmitting means normally resiliently urging said motion transmitting means to a first same position whenever said selector lever means is in said neutral position.

9. A turn signal switch and assembly according to claim 1 wherein said abutment means comprises first and second spaced abutment portions carried by said selector lever means in a manner as to be generally extending therefrom and resulting in said selector lever means being generally between said abutment portions and said switch housing means.

10. A turn signal switch assembly according to claim 9 wherein said first and second spaced abutment portions are separate from but fixedly carried by said selector lever means.

11. A turn signal switch and assembly according to claim 1 wherein said support body comprises relatively upper and lower locating surfaces for operative engagement with said switch housing means for thereby affecting relative alignment as between said motion transmitting means and said abutment means.

12. A turn signal switch and assembly according to claim 1 wherein said motion transmitting means comprises a force-transmitting lever, and further comprising pivot means pivotally operatively securing said force-transmitting lever to said support body means, and a bridge-like support portion carried by said support body means and extending generally transversely to the axis of said pivot means, said support portion being operatively engaged with said pivot means to provide lateral support thereto.

13. A turn signal switch and assembly according to claim 1 wherein said motion transmitting means comprises a force-transmitting lever, and further comprising pivot means pivotally operatively securing said force-transmitting lever to said support body means, and a bridge like portion carried by said support body means, said bridge portion extending over a substantial portion of said force-transmitting lever as to act as a shielding cover therefor and to generally contain said force-transmitting lever between said support body means and said bridge portion.

14. A turn signal switch and assembly according to claim 1 wherein said motion transmitting means comprises a force-transmitting lever, and further comprising pivot means pivotally operatively securing said force-transmitting lever to said support body means, and a bridge like portion carried by said support body means, said bridge portion overlying a substantial portion of said force-transmitting lever and said abutment means as to thereby serve as a shielding cover therefor.

15. A turn signal switch and assembly according to claim 1 wherein said motion transmitting means comprises a force-transmitting lever, and further comprising a pivot member carried by said support body means and operatively pivotally connected to said force-transmitting lever, and coiled spring means carried about said pivot member and operatively connected to said force-transmitting lever for continually urging said force-transmitting lever to a null condition with respect to said abutment means.

16. In the combination of a vehicular steering column housing at least partially containing steering gear means and a turn signal switch assembly totally mounted externally of said column housing wherein said turn signal switch assembly comprises a selector lever which has to be manually moved to and from all selected operating positions and to and from a neutral position, the improvement of a spacer body separate from said switch assembly and abutably engaging said switch assembly and said column housing as to be generally interposed therebetween and dispose said switch assembly an added distance away from the longitudinal axis of said column housing, an actuating member secured to a movable portion of said steering gear means, a lever member pivotally carried by said spacer body, and spring means carried by said spacer body and resiliently urging said lever member into a neutral position, said lever member having a first portion thereof engageable by said actuating member and a second portion thereof operatively engageable with said selector lever, said lever member being effective when engaged by said actuating member to forcibly rotate said selector lever from a selected operating position to said neutral position of said selector lever thereby obviating the necessity of manually moving said selector lever from said selected operating position to said neutral position of said selector lever.

17. The combination of vehicle steering gear means, a manually positionable steering wheel means operatively connected to said steering gear means, steering gear housing means enclosing at least a portion of said steering gear means, a vehicular turn signal switch assembly for causing an indication of the intended direction of travel of said vehicle, said turn signal switch assembly comprising switch housing means totally enclosing related actuatable electrical switching elements which when actuated in a preselected manner serve to complete related electrical circuit means leading to associated sensory warning devices, selector lever means carried by said switch housing means generally externally thereof, said selector lever means being manually movable to selected operating positions and to a selector lever null position, said selector lever means being effective upon being moved to and from said selected operating positions to actuate said switching elements and to thereby complete and open said related electrical circuit means, an actuator member operatively fixedly connected to said steering wheel means and rotatable therewith about the longitudinal axis of said steering gear housing means, a mounting body for said switch housing means, said mounting body having first mounting surface means adapted for operatively engaging the outer surface of said steering gear housing means, said mounting body having second mounting surface means generally opposite to said first mounting surface means for operatively engaging an outer surface of said switch housing means, and an actuator lever situated totally externally of said switch housing means and pivotally carried by said mounting body, said actuator lever having a first arm portion positionable as to be engageable by said actuator member, said actuator lever being effective when engaged by said actuator member and when said selector lever is in one of said selected operating positions to operatively engage and forcibly move said selector lever from said one of said selected operating positions to said selector lever null position.

18. The combination according to claim 17 and further comprising, in combination, clamping means for compressibly securing said switch housing said mounting body and said steering gear column housing into a unitary structure.

19. Adapter means for converting a manually operable turn signal switch assembly having an outer enveloping switch housing to one which is automatically cancelled in response to rotation of steering means of the associated vehicle, said adapter means comprising lever means generally interposed between said turn signal switch assembly switch housing and associated vehicular steering column housing means, an adapter body pivotally carrying said lever means, said adapter body comprising first and second mounting surface means, said first mounting surface means being effective to be operatively engaged with said associated steering column housing means externally thereof and said second mounting surface means being effective to be operatively engaged with said switch housing externally thereof as to thereby place said adapter body generally radially outwardly of said associated steering column means and between said associated steering column means and said switch housing, said lever means being at times acted upon by motion transmitting means actuated in response to rotation of said steering means and effective to at least at certain of such times engage a portion of selector arm means associated with and comprising a portion of said turn signal switch assembly as to thereby forcibly and automatically move said selector arm means from a previously selected position to a neutral position.

\* \* \* \* \*